Jan. 5, 1965 H. E. MENSER 3,164,345
PIPE HANGER SUPPORT BRACKET
Filed June 21, 1962 3 Sheets-Sheet 1
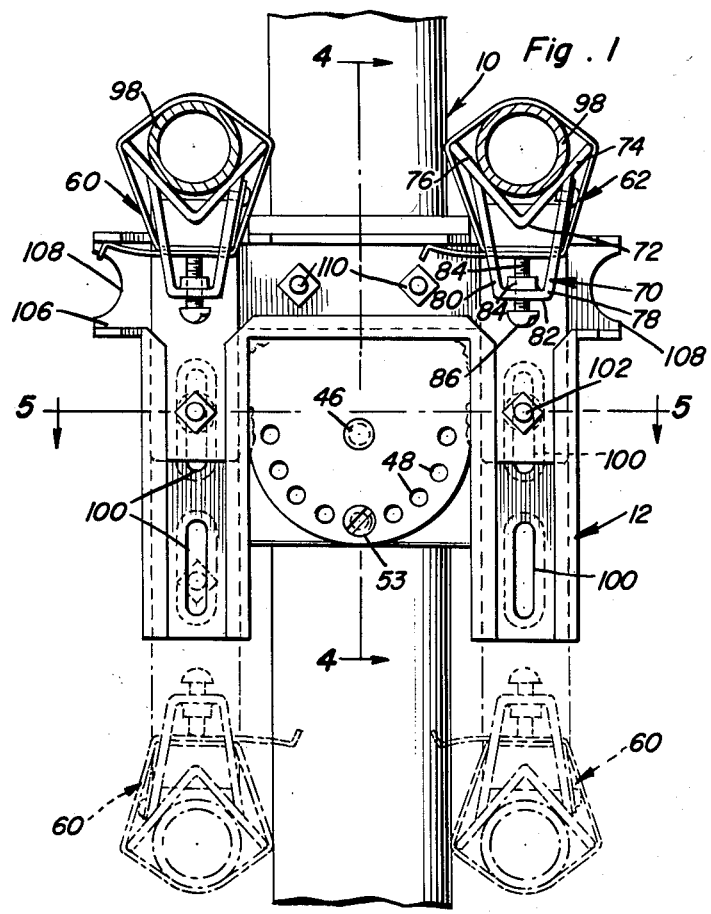
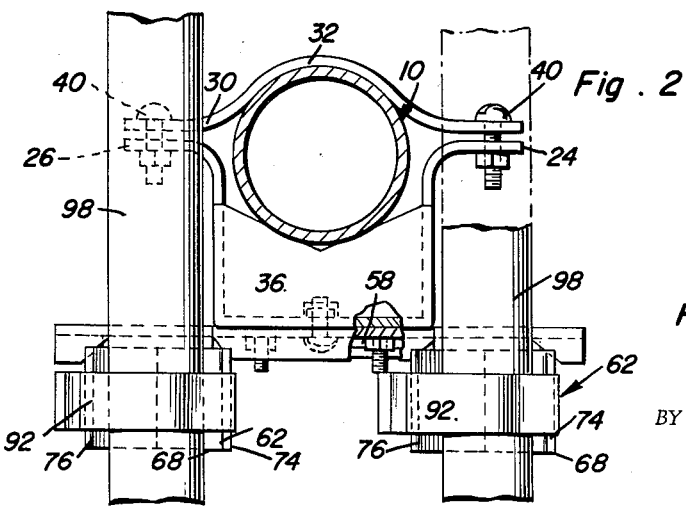
Henry E. Menser
INVENTOR.

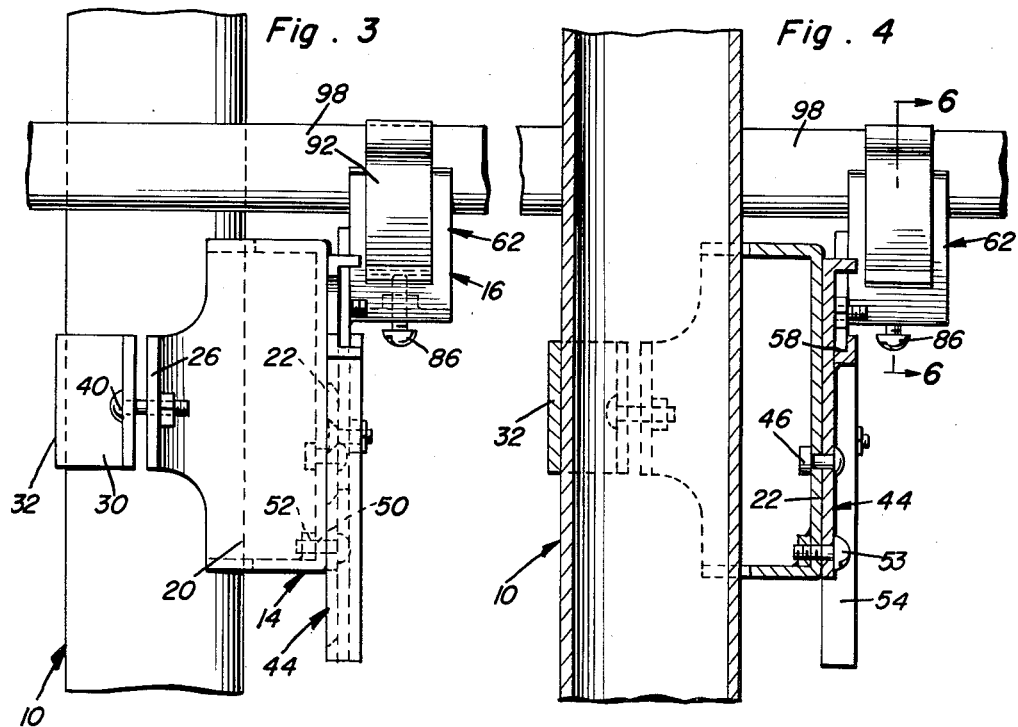
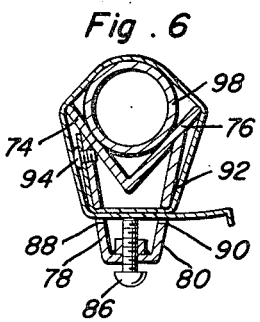
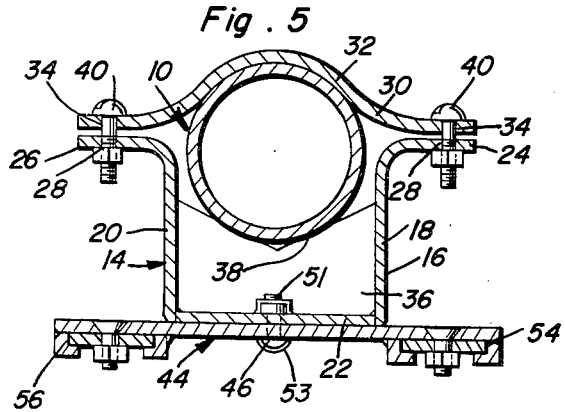
Henry E. Menser
INVENTOR.

Jan. 5, 1965  H. E. MENSER  3,164,345
PIPE HANGER SUPPORT BRACKET

Filed June 21, 1962  3 Sheets-Sheet 3

Henry E. Menser
INVENTOR.

BY
Attorneys

# United States Patent Office 3,164,345
Patented Jan. 5, 1965

3,164,345
PIPE HANGER SUPPORT BRACKET
Henry E. Menser, Drakesboro, Ky.
(2637 165th St., Hammond, Ind.)
Filed June 21, 1962, Ser. No. 204,225
10 Claims. (Cl. 248—68)

This invention relates to a novel and useful pipe hanger support bracket and more specifically to a support bracket which is designed primarily for the purpose of supporting a plurality of pipe sections.

The pipe hanger support bracket of the instant invention may be readily adapted for the purpose of supporting objects other than pipe sections and it is constructed in a manner whereby the pipe hanger support bracket itself may be readily supported from a pipe section or from a flat supporting surface.

The pipe hanger support bracket includes a mounting bracket which is adapted to be connected to any suitable support element such as a supporting surface or pipe section and a support member is pivotally mounted on the mounting bracket and means is provided for securing the support member in adjusted rotated positions relative to the mounting bracket. The support member has a plurality of pipe hanger supports mounted thereon for adjustable positioning laterally of the axis of rotation of the support member relative to the mounting bracket and each of the hanger supports includes means adapted to clampingly engage an elongated pipe section.

The pipe hanger supports adapted to clampingly engage elongated pipe sections each include means for clampingly engaging an elongated pipe section which generally parallels the axis of rotation of the support member relative to the mounting bracket and therefore each of the pipe sections supported by the pipe hanger support bracket may be adjustably positioned through an arc having radii extending transversely of the pipe sections which are supported by the pipe hanger support bracket.

In addition to each of the individual pipe sections supported by the pipe hanger support bracket being adjustable through arcs extending laterally of those individual pipe sections, the pipe hanger support bracket includes means for adjustably positioning the individual pipe hangers supported thereby in a direction extending transversely of the axis of rotation of the support member relative to the mounting bracket along a rectilinear path fixed relative to the support member. Accordingly, it may be seen that the pipe hanger support bracket of the instant invention is readily adapted to support individual pipe sections in numerous varied positions relative to a supporting member to which the pipe hanger support bracket is secured.

The main object of this invention is to provide a pipe hanger support bracket which will be capable of supporting a plurality of individual pipe sections in an infinite number of positions laterally spaced from each other in directions disposed at right angles to each other and extending transversely of the indivdual pipe sections.

A further object of this invention, in accordance with the immediately preceding object, is to provide a pipe hanger support bracket which will be readily adapted for supporting individual pipe sections of different diameters.

A still further object of this invention is to provide a pipe hanger support bracket in accordance with the preceding objects including means adapting the support bracket for support from a pipe section or a suitable planar supporting surface.

Yet another object of this invention is to provide a pipe hanger support bracket which will be capable of clampingly engaging and rigidly supporting a plurality of pipe sections relative to the support bracket.

A final object to be specifically enumerated herein is to provide a pipe hanger support bracket in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part thereof, wherein like numerals refer to like parts throughout, and in which:

FIGURE 1 is a front elevational view of the pipe hanger support bracket of the instant invention shown supported from a pipe section and being utilized to support a plurality of pipe sections in fixed positions relative to the first-mentioned pipe section;

FIGURE 2 is a top plan view of the embodiment illustrated in FIGURE 1 with portions thereof being removed and shown in section;

FIGURE 3 is a side elevational view of the embodiment illustrated in FIGURE 1;

FIGURE 4 is a fragmentary vertical sectional view taken substantially upon the plane indicated by the section line 4—4 of FIGURE 1;

FIGURE 5 is a horizontal sectional view taken substantially upon the plane indicated by the section line 5—5 of FIGURE 1;

FIGURE 6 is a vertical sectional view taken substantially upon the plane indicated by the section line 6—6 of FIGURE 4;

Figure 7:
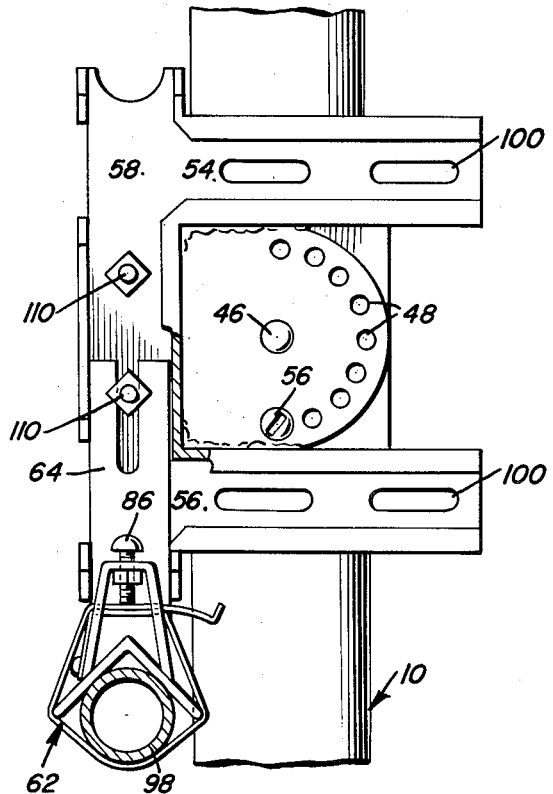
FIGURE 7 is a front elevational view similar to that of FIGURE 1 but showing the support member of the pipe hanger support bracket in a rotated position relative to the mounting bracket and with parts thereof being broken away and shown in section.
Figure 8:
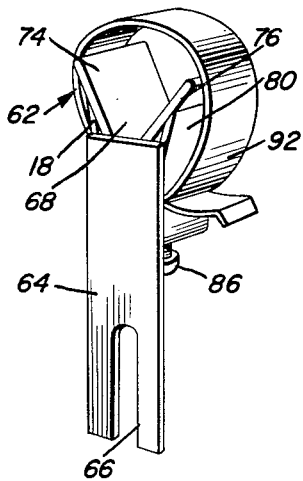
FIGURE 8 is a perspective view of one of the pipe hanger supports of the pipe hanger support bracket.

Referring now more specifically to the drawings the numeral 10 generally designates a supporting pipe to which the pipe hanger support bracket of the instant invention is fixedly secured. The pipe hanger support bracket is generally referred to by the reference numeral 12 and includes a mounting bracket generally referred to by the reference numeral 14. The mounting bracket 14 comprises a clamp assembly composed of a first section 16 which is generally U-shaped in configuration and includes a pair of generally parallel arms 18 and 20. One pair of corresponding ends of the arms 18 and 20 are interconnected by means of a bight portion 22 and the free ends of the arms 18 and 20 include laterally outwardly directed flanges 24 and 26, respectively, which are each apertured as at 28. The second section of the clamp assembly defined by the mounting bracket 14 is referred to by the reference numeral 30 and comprises an elongated strap-like member having a bowed mid-portion 32 and a pair of apertures 34 formed in its opposite end portions. A pair of bracing gussets 36 are rigidly secured between corresponding opposite adjacent edge portions of the arms 18 and 20 and the bight portion 22. Each of the gussets 36 includes a V-shaped notch 38 which opens outwardly away from the bight portion 22 and it will be noted that the notches 38 are aligned and adapted to cradle one side of the supporting pipe 10 to which the pipe hanger support bracket 12 is supported. The elongated strap member 30 is secured over the other side of the supporting pipe 10 and has its opposite end portion secured to the apertured flanges 24 and 26 by means of suitable fasteners 40. It may accordingly be seen that the mounting bracket 14 may be secured in any one of a plurality of adjusted rotated positions about the longitudinal axis of the supporting pipe 10 by means of the clamp assembly defined by the mounting bracket.

The pipe hanger support bracket 12 includes a support member generally referred to by the reference numeral 44 and it may best be seen from FIGURE 5 of the drawings that the support member 44 is pivotally secured to the bight portion 22 by means of a pivot fastener 46. From a comparison of FIGURES 1 and 5 of the drawings it may be seen that the support member 44 includes a plurality of apertures 48 which are arranged in an arc having the pivot fastener 46 at its center point and that the bight portion 22 has an aperture formed therethrough referred to by the reference numeral 50 with which each of the apertures 48 is registrable. A threaded nut 52 is rigidly affixed to the side of the bight portion 22 remote from the support member 44 and is registered with the aperture 50 and has the threaded shank portion 51 of a lock screw 53 threadedly engaged therein. The shank portion 51 passes through a selected one of the apertures 48 and thereby retains the support member in adjusted rotated positions relative to the mounting bracket 14.

The support member or plate 44 includes means defining three elongated channels 54, 56 and 58 and it will be noted that the channels 54 and 56 generally parallel each other while the channel 58 is disposed at right angles to the channels 54 and 56. The channels 54 and 56 extend along opposite sides of the support member or plate 44 and the channel 58 extends across the top of the support plate 44. A plurality of pipe hanger supports each generally referred to by the reference numeral 60 are provided and each of the pipe hanger supports includes a clamp assembly generally referred to by the reference numeral 62 which is fixedly supported from an elongated base portion 64 that is panel-like in configuration. The clamp assemblies 62 are each secured to one end of the corresponding base portion 64 and a longitudinally opening slot 66 is formed in each base portion 64 remote from the corresponding clamp assembly 62.

Each of the clamp assemblies 62 comprises a V-shaped cradle member 68 which is fixedly supported from the base portion 64 in any convenient manner and a generally U-shaped anchor assembly referred to in general by the reference numeral 70 straddles the apex 72 of the corresponding cradle member defined by the legs 74 and 76 thereof and is fixedly secured to the legs 74 and 76. The arms 78 and 80 of each U-shaped member 70 are interconnected at their ends remote from the corresponding cradle member 68 by means of a bight portion 82 which is apertured and has a threaded nut 84 fixedly secured thereto in which the threaded shank portion 84 of a locking screw 86 is threadedly engaged.

Each pair of arms 78 and 80 has registered slots 88 and 90 respectively formed therein. One end of a clamp strap 92 is fixedly secured to the arm 80 by means of a fastener 94 and the other end of the clamp strap 92 passes through the slots 88 and 90 and then passes around the free ends of the legs 74 and 76 and back through the slots 88 and 90. Upon adjustment of the lock screw 86, the portions of the clamp strap 92 disposed between the arms 78 and 80 will be laterally deflected thereby causing the clamp strap 92 to urge the pipe section 98 engaged thereby into tight seated engagement within the V-shaped cradle member 68.

Each of the channels 54, 56 and 58 includes a bight portion which has one or more slots 100 formed therein and a locking screw or fastener 102 is provided for each elongated base portion and is secured through each of the slots 66 which is registrable with the corresponding slot 100. In this manner, it may be seen that each of the base portions may be secured in adjusted longitudinally shifted positions by means of the corresponding fastener 102.

It will be noted that the opposite ends of the bight portion 106 of the channel 58 have endwise opening notches 108 formed therein which are semi-circular and are adapted to receive the adjacent side of a pipe hanger section supported from one of the pipe hanger supports 60 whose base portion 64 is secured within the channel 58. It will be noted that the bight portion 106 of the channel 58 is secured to the support member or plate 44 by means of fasteners 110 which may also be used to secure one of the base portions 64 within the associated end of the channel 58 with the corresponding fastener 110 the channel or notch 66 formed in that base portion 64.

Figure 9:
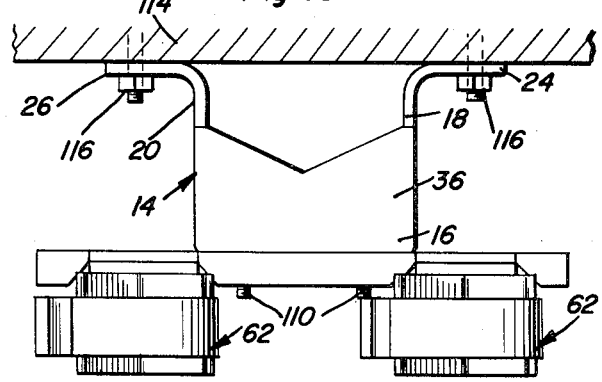
FIGURE 9 is a top plan view of the pipe hanger support bracket showing the manner in which it may be secured to a planar supporting member.

In operation, the pipe hanger support bracket 12 may be secured to the supporting pipe 10 as hereinbefore set forth or may be secured to a planar supporting surface 114 by means of fasteners 116 secured through the apertured flanges 24 and 26 of the mounting bracket 14 whose opposite ends are embedded or secured in the planar support 114 as viewed in FIGURE 9 of the drawings.

After the pipe hanger support bracket has been suitably mounted, the support member may be adjustably rotated relative to the support bracket and retained in adjusted rotated position by means of the locking screw 53. Then, the pipe sections which are to be supported by the support bracket may have the corresponding hanger supports slidably engaged in the selected channel and locked therein by means of the fasteners 102 and 110. Then, each pipe section 98 may be cradled in the corresponding cradle member 68 and retained therein by means of the clamping strap 92 as hereinbefore set forth. If it is desired, the adjusted rotated position of the support member or plate 44 relative to the mounting bracket 14 may be changed after the pipe sections 98 have been clampingly engaged by means of the clamp assemblies 62.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A pipe hanger support bracket comprising a mounting bracket adapted to be secured to a support element, a support member, means pivotally mounting said support member on said mounting bracket and including means for securing said support member in adjusted rotated positions relative to said mounting bracket, a plurality of pipe hanger supports, means mounting said hanger supports on said support member for adjustable positioning laterally of the axis of rotation of said support member, each of said hanger supports including means adapted to clampingly engage an elongated pipe section.

2. The combination of claim 1 wherein each of said pipe hanger supports includes means adapted to clampingly engage an elongated pipe section generally paralleling the axis of rotation of said support member.

3. The combination of claim 2 wherein said means adapted to clampingly engage an elongated pipe section each include means for completely encircling pipe sections of different diameters.

4. The combination of claim 1 wherein each of said mounting means includes means mounting said hanger supports for guided rectilinear adjustment laterally of the axis of rotation of said support member.

5. The combination of claim 4 wherein said mounting means include means for selectively mounting at least some of said hanger supports for rectilinear adjustment in directions disposed at substantially right angles relative to each other.

6. The combination of claim 5 wherein each of said pipe hanger supports includes means adapted to clampingly engage an elongated pipe section generally paralleling the axis of rotation of said support member.

7. The combination of claim 6 wherein said means adapted to clampingly engage an elongated pipe section each include means for completely encircling pipe sections of different diameters.

8. The combination of claim 1 wherein each of said mounting means includes means mounting said hanger supports for guided rectilinear adjustment laterally of the axis of rotation of said support member, said mounting means each including channel defining means, said hanger supports each including an elongated base portion slidingly disposed in the corresponding channel defining means for longitudinal rectilinear movement therein.

9. The combination of claim 1 wherein said mounting bracket includes clamp means adapted to clampingly engage a pipe section and thereby rigidly affix said mounting bracket to said last-mentioned pipe section.

10. The combination of claim 9 wherein each of said pipe hanger supports includes means adapted to clampingly engage an elongated pipe section generally paralleling the axis of rotation of said support member.

References Cited in the file of this patent
UNITED STATES PATENTS

| | | |
|---|---|---|
| 2,550,001 | Button | Apr. 24, 1951 |
| 2,954,909 | Miller et al. | Oct. 4, 1960 |

FOREIGN PATENTS

| | | |
|---|---|---|
| 71,001 | Norway | June 2, 1947 |
| 1,038,226 | France | Sept. 25, 1953 |